(12) United States Patent
Meyyappan

(10) Patent No.: US 9,911,544 B1
(45) Date of Patent: Mar. 6, 2018

(54) METAL OXIDE VERTICAL GRAPHENE HYBRID SUPERCAPACITORS

(71) Applicant: The United States of America as Represented by the Administrator of the National Aeronautics & Space Administration (NASA), Washington, DC (US)

(72) Inventor: Meyya Meyyappan, San Jose, CA (US)

(73) Assignee: The United States of America as Represented by the Administrator of NASA, Washington, DC (US)

( * ) Notice: Subject to any disclaimer, the term of this patent is extended or adjusted under 35 U.S.C. 154(b) by 163 days.

(21) Appl. No.: 14/301,285

(22) Filed: Jun. 10, 2014

(51) Int. Cl.
*H01G 11/28* (2013.01)
*H01G 11/32* (2013.01)
*H01G 11/86* (2013.01)

(52) U.S. Cl.
CPC ............. *H01G 11/32* (2013.01); *H01G 11/28* (2013.01); *H01G 11/86* (2013.01)

(58) Field of Classification Search
CPC ............ H01G 9/155; H01G 9/00; H01G 9/04; H01G 11/24; H01G 11/42
USPC ................. 361/502, 503–504, 512, 525–529
See application file for complete search history.

(56) References Cited

U.S. PATENT DOCUMENTS

| | | | | |
|---|---|---|---|---|
| 6,288,888 B1* | 9/2001 | Sakata | ............... | H01G 9/155 361/502 |
| 8,333,810 B1* | 12/2012 | Meyyappan | ......... | H01G 11/36 29/25.03 |
| 8,503,162 B2* | 8/2013 | Seymour | ............... | H01G 11/36 361/502 |
| 9,190,667 B2* | 11/2015 | Zhamu | ................ | H01G 9/058 |
| 9,333,810 B2 | 5/2016 | Emorine et al. | | |
| 2009/0325071 A1* | 12/2009 | Verbrugge | ........... | C01B 31/04 429/219 |
| 2010/0273051 A1* | 10/2010 | Choi | ..................... | C25D 9/04 429/213 |
| 2011/0051322 A1* | 3/2011 | Pushparaj | ............. | C23C 16/24 361/525 |
| 2014/0183415 A1* | 7/2014 | Song | ..................... | B82Y 30/00 252/502 |
| 2014/0234680 A1* | 8/2014 | Yoon | ..................... | H01G 11/36 429/94 |
| 2015/0340170 A1* | 11/2015 | Jun | ....................... | H01G 11/48 361/502 |

OTHER PUBLICATIONS

Meryl D. Stoller et al. "Graphene-Based Ultracapacitors" published by American Chemical Society on Sep. 13, 2008.
Yan Wang et al. "Supercapacitor Devices Based on Graphene Material" published by American Chemical Society on Jul. 6, 2009.

(Continued)

*Primary Examiner* — Nguyen Ha
(74) *Attorney, Agent, or Firm* — John F. Schipper; Robert M. Padilla; Mark P. Dvorscak

(57) ABSTRACT

A metal oxide vertical graphene hybrid supercapacitor is provided. The supercapacitor includes a pair of collectors facing each other, and vertical graphene electrode material grown directly on each of the pair of collectors without catalyst or binders. A separator may separate the vertical graphene electrode materials.

11 Claims, 4 Drawing Sheets

(56) References Cited

OTHER PUBLICATIONS

Jianjun Wang et al. "Synthesis of Carbon Nanosheets by Inductively Coupled Radio-Frequency Plasma Enhanced Chemical Vapor Deposition" published online at www.sciencedirect.com on Aug. 14, 2004.

G.D. Yuan et al. "Graphene Sheets via Microwave Chemical Vapor Deposition" published online at www.sciencedirect.com on Nov. 27, 2008.

Meyya Meyyappan "Nanostructured Materials for Supercapacitors" published by Journal of Vacuum Science and Technology A on May 9, 2013.

* cited by examiner

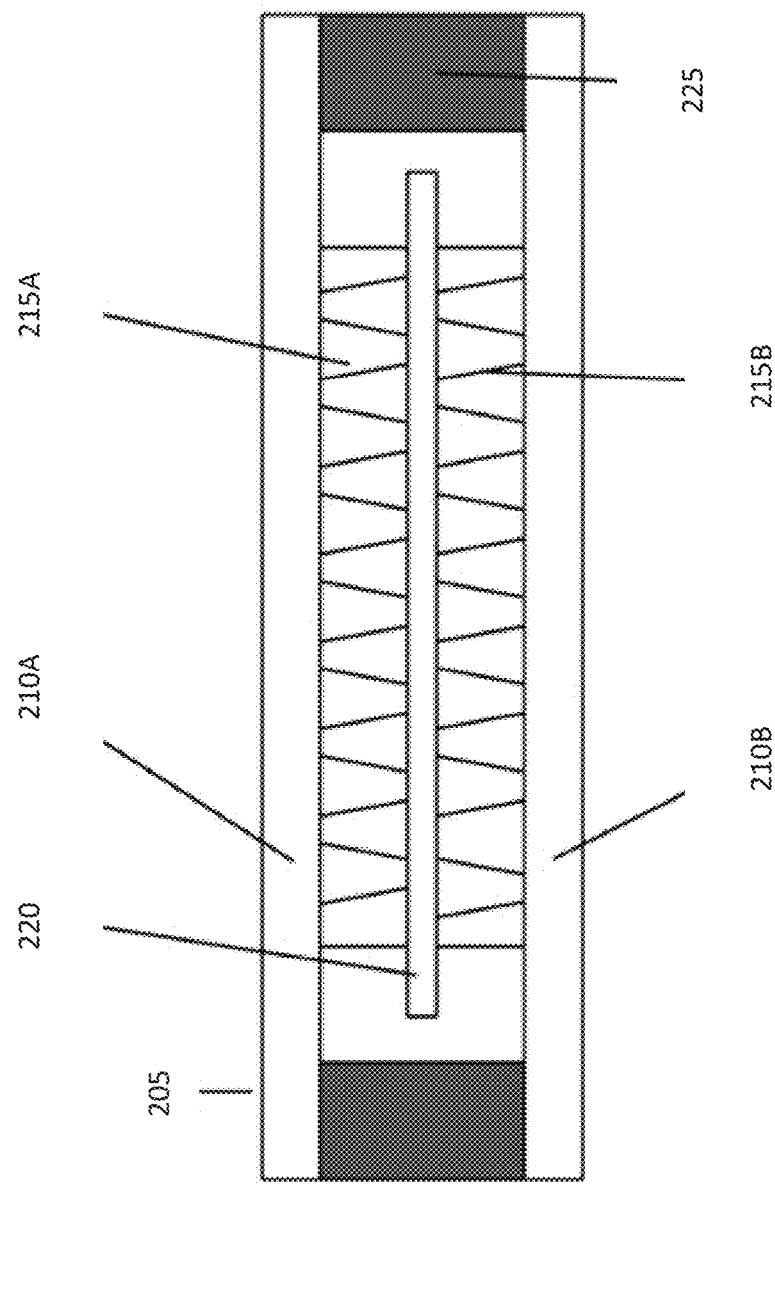

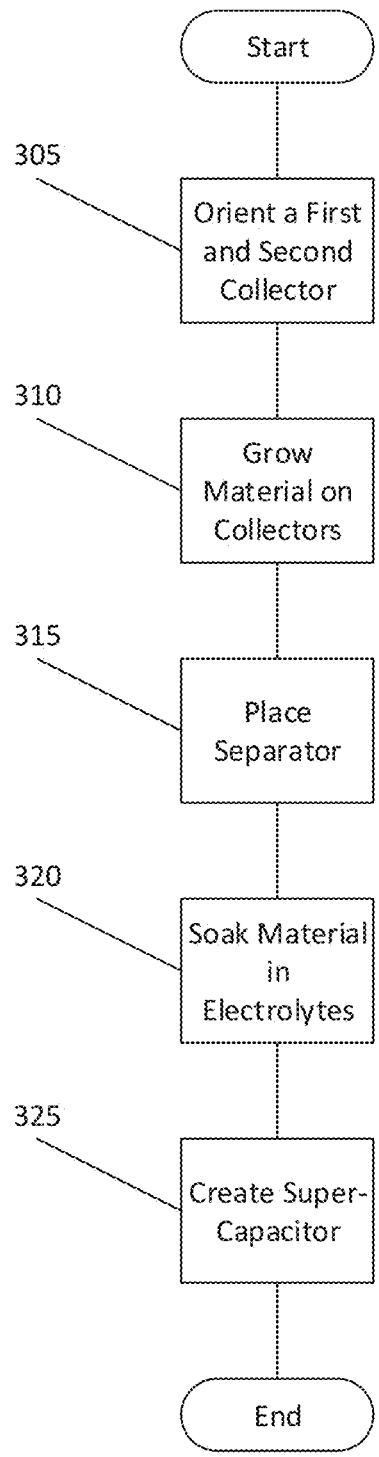

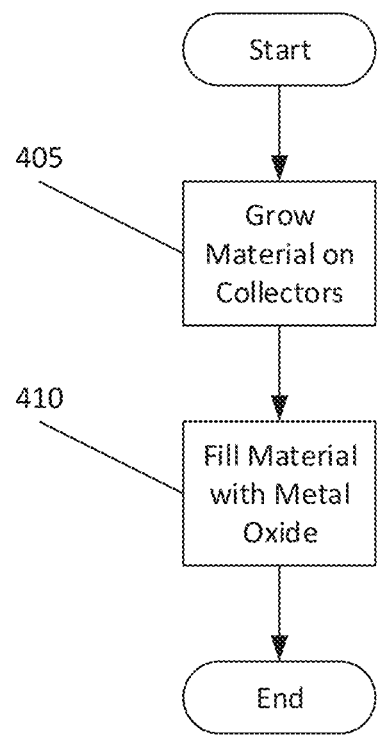

METAL OXIDE VERTICAL GRAPHENE HYBRID SUPERCAPACITORS

ORIGIN OF THE INVENTION

This invention described herein was made by an employee of the United States Government and may be manufactured and used by or for the Government of the United States of America for governmental purposes without the payment of any royalties thereon or therefore.

FIELD OF THE INVENTION

The present invention generally pertains to supercapacitors, and, more particularly, to vertical graphene supercapacitors.

BACKGROUND OF THE INVENTION

Supercapacitors, also known as ultracapacitors, are energy storage devices that provide high power density (in units of kw/kg). Supercapacitors can be used in multiple applications. For example, supercapacitors can be used as load leveling in electric vehicles allowing extension of battery life, as a power source in hybrid vehicles, and as an energy source in automobiles from simple lighting to power-assisted functions such as car steering, doors, windows, trunks, etc. Supercapacitors may also be used in memory back-up in computers, power tools, fork lifts, robots, powering buses, trolleys, light rail, golf carts, delivery carts, and all types of commuter vehicles. Supercapacitors may further be used as uninterrupted power supplies, for powering biomedical devices, implantable devices, portable electronics, consumer electronics, laptops, and much more.

Supercapacitors are superior to conventional batteries, and provide a long cycle life up to a million cycles. However, while supercapacitors are superior to conventional secondary ion batteries, the energy density of supercapacitors is lower than that of conventional batteries.

Thus, a supercapacitor with a high energy density may be beneficial.

SUMMARY OF THE INVENTION

Certain embodiments of the present invention may be implemented and provide solutions to the problems and needs in the art that have not yet been fully solved by conventional supercapacitors. For example, some embodiments pertain to a supercapacitor that includes a pair of collectors facing each other. Vertical graphene electrode material may be grown on each collector without catalyst or binders, and a separator may be used to separate the vertical graphene electrode material.

In one embodiment, an apparatus includes a pair of collectors oriented to face each other, and vertical graphene electrode material grown on each of the pair of collectors without catalyst or binders. The apparatus also includes a separator configured to separate the vertical graphene electrode materials.

In another embodiment, a method for manufacturing a supercapacitor includes orienting a first collector and a second collector such that the first collector and the second collector face each other. The method also includes growing a first vertical graphene electrode material on a first collector and a second vertical graphene electrode material on a second collector. The method further includes separating, by a separator, the first vertical graphene electrode material and the second vertical graphene electrode material.

In yet another embodiment, an apparatus includes a first collector and a second collector configured to face each other and separated by a selected distance. The apparatus also includes a first vertical graphene electrode material directly grown on a first collector, and a second vertical graphene electrode material directly grown on a second collector. The apparatus further includes a separator configured to separate the first vertical graphene electrode material and the second vertical graphene electrode material, and a packaging assembly configured to enclose the first and second collector, the first and second vertical graphene electrode materials, and the separator.

BRIEF DESCRIPTION OF THE DRAWINGS

In order that the advantages of certain embodiments of the invention will be readily understood, a more particular description of the invention briefly described above will be rendered by reference to specific embodiments that are illustrated in the appended drawings. While it should be understood that these drawings depict only typical embodiments of the invention and are not therefore to be considered to be limiting of its scope, the invention will be described and explained with additional specificity and detail through the use of the accompanying drawings, in which:

FIG. 2 illustrates a supercapacitor, according to an embodiment of the present invention.

FIG. 3 is a flow diagram illustrating a process for manufacturing the supercapacitor, according to an embodiment invention.

FIG. 4 is a flow diagram illustrating a process for growing vertical graphene electrodes, according to an embodiment of the present invention.

DETAILED DESCRIPTION OF THE EMBODIMENTS

Figure 1:
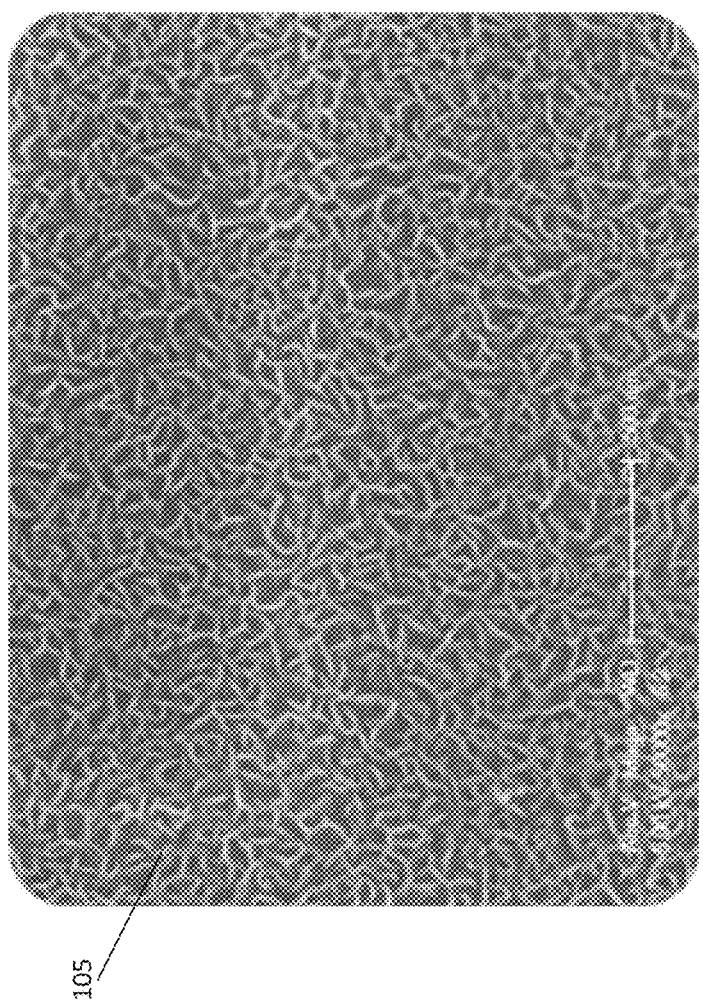
FIG. 1 illustrates a substrate with vertical graphene, according to an embodiment of the present invention.

Efforts continue to increase the energy density while maintaining a high cycle life and high power density to improve safety, reliability and reduce cost. In this regard, nanostructured materials offering high surface area and porosity emerge as valuable candidates for electrode construction. For example, multiwalled carbon nanotubes grown like towers directly on metal substrates may reduce the interfacial resistance and increase the specific capacitance. This type of structure may provide capacitance values as high as 550 F/g, exceeding published values for carbon nanotubes, graphene, and other carbon structures.

Supercapacitors may be broadly classified into two categories—electrochemical double layer capacitors (EDLC) and redox capacitors. EDLC stores energy similar to an electrical capacitor but the surface area is increased with the use of a porous structure. In EDLC, Faradaic reactions between the electrolyte and the electrodes are absent. Instead, the EDLC includes a simple charge transfer across the interface.

In redox supercapacitors, electron transfer reactions occur during the charge and discharge cycle. The resulting capacitance due to these Faradaic reactions is known as psuedocapacitance, and therefore, redox capacitors are also called psuedocapacitors. Generally, the redox capacitors utilize metal oxides but electrically conducting polymers (ECPs), such as polyaniline and polypyrrole, are also popular.

In the case of metal oxides, performance in terms of specific capacitance, power and energy densities are used to rank the suitability of various oxides. However, from a cost point of view, the following guide using current price may be used: 1532 Ru>21 W>12 V≥12 Co>11 Sn>8 Ni>4 Cu>3.6 Ti>3.0 Mn>1.5 Mg>1.2 Cr>1.0 Al≥1.0 Zn where the number preceding each element symbol denotes the ratio of the price of that particular metal element to the price of Zn, which is approximately $0.94 per pound at present time.

Carbon structures are typically used to construct EDLCs. However, it should be noted that graphite, carbon nanotubes and graphene can be mixed with any of the above oxides to take advantage of the Faradaic reaction. This may increase the specific capacitance, thus offering "hybrid supercapacitors". Coating graphite, carbon nanotubes and graphene with electrically conducting polymers can also be useful to construct hybrid supercapacitors.

A series resistance in a supercapacitor is shown below:

$$R = R_c + R_{em} + R_{int} + R_{el} + R_{ion} + R_{sep} \quad (1)$$

where R is the total resistance, $R_c$ is the collector metal resistance, $R_{em}$ is the electrode material resistance, $R_{int}$ is the interfacial resistance between the electrode material and the collector metal, $R_{el}$ is the electrolyte resistance, $R_{ion}$ is the resistance due to ion transport through the pores in the electrode material, and $R_{sep}$ is the resistance of the separator between the two electrodes. Interfacial resistance $R_{int}$ is a dominant component among all the contributions in Equation (1). In the case of carbon nanotubes, direct growth of the carbon nanotubes on metal substrates, such as a tower, may reduce the interfacial resistance $R_{int}$.

Conventional methods require the carbon nanotubes or graphene to be mixed with a binding material to produce a paste. The paste can be screen printed as electrodes on collector metals. The fraction of binding material added varies depending on the formulations. However, it should be noted that binders do not contribute to the active function of the supercapacitor. Instead, binders add to the resistance, and also add to the dead weight. Furthermore, since all metrics are reported based on weight in Kg, weight based performance is generally lowered by adding binders.

Graphene has been used in the form above with a binder to construct supercapacitors. However, the specific capacitance reported has not been more than 350 F/g using conventional aqueous and organic electrolytes. In most cases, bulk-produced graphene (regardless of the method of preparation) is mixed with a binder, and applied to the collector metal to construct the electrode. In principle, chemical vapor deposition (CVD) may be directly used on a collector metal, such as copper, to grow graphene layer-by-layer to the desired thickness. However, this will be impractical when a thickness of the order of 0.5-1.0 µm is needed.

It should be appreciated that graphene may be grown as vertical graphene on a substrate using plasma enhanced chemical vapor deposition (PECVD). Vertical graphene may also be called carbon nanowall (CNW), because the vertical graphene resembles a wall, but in nanodimensions. It should also be appreciated that any type of plasma source may be used to grow vertical graphene. For example, direct current (DC), radiofrequency (RF) capacitively coupled, RF inductively coupled, microwave, electron cyclotron resonance, helicon, etc., may be used to grow vertical graphene. A variety of substrates, such as Silicon (Si), Nickel (Ni), Titanium (Ti), Copper (Cu), Germanium (Ge), Tungsten (W), Tantalum (Ta), Molybdenum (Mo), Silicon Dioxide ($SiO_2$), Aluminum Oxide ($Al_2O_3$), quartz, stainless steel, may also be used for the growth of the vertical graphene.

Generally, there is no catalyst involved when growing the vertical graphene. The height of the vertical graphene may be as low as few tens of nanometers (nm) using very short growth time, and as high as two to five microns by extending the growth time. The growth characteristics, including the growth rate, are controlled by numerous parameters. These parameters may include type of substrate that is used, feedgas type (e.g., hydrocarbons such as methane, acetylene, etc.), and hydrocarbon/$H_2$ ratio when a diluting gas, such as $H_2$, is used. The parameters may also include Argon (Ar) when any other inert carrier gas is used such as $N_2$, total gas flow rate, type of plasma source (e.g., DC, RF, inductive, microwave, etc.), plasma power, pressure in the reactor, growth temperature, etc.

FIG. 1 illustrates a substrate 100 with vertical graphene 105, according to an embodiment of the present invention. In this embodiment, vertical graphene 105 is grown by radiofrequency, and is capacitively coupled to plasma to enhance CVD on copper substrate 100. FIG. 1 also shows that vertical graphene 105 appears to be standing like a wall on substrate 100. The scrolls typically include a few layers of graphene, e.g., 2-10 layers. In some embodiments, a single layer graphene may be grown vertically.

As shown in FIG. 1, graphene may be grown directly and vertically on metal substrates, such as copper and stainless steel. In a similar manner, graphene may be useful to carbon nanotubes grown directly like towers on metal substrates. The reason for this is the expected reduction in interfacial resistance $R_{int}$ in Equation (1). However, the use of vertical graphene in place of carbon nanotube towers may or may not perform as well for the following reasons.

Typically, in carbon nanotubes, a wide variety of pore size is found. For example, submicropores can be less 0.5 nm, micropores can be less than <2 nm, mesopores range from 2 to 50 nm, and macropores are typically greater than 50 nm. In this embodiment, mesopores are suitable for ion transport in supercapacitor operation. Carbon nanotubes also have large surface area. Thus, vertical graphene as shown in FIG. 1 may be used for the construction of electrical double layer type supercapacitors. The expected performance relative to carbon nanotube towers depends on the nature of mesopores and surface area of the vertical graphene. For example, the pore size on the top surface in FIG. 1 appears to be 10-20 nm. This size also should be controllable using the growth rate parameters discussed above.

In addition to the above approach to construct EDLC, vertical graphene directly grown on metal substrates may be used for the construction of redox capacitors by filling the pores with metal oxide. The combination of vertical graphene and metal oxide directly on metal substrates may create a hybrid supercapacitor with no catalysts for growth and/or no binders to mix graphene and metal oxide.

FIG. 2 illustrates a supercapacitor 200, according to an embodiment of the present invention. Supercapacitor 200 includes a first planar collector 210A and second planar collector 210B. While collectors 210A, 210B are planar in this embodiment, collectors 210A, 210B may include copper foil or aluminum foil in other embodiments. For simplicity, first planar collector 210A and second planar collector 210B may be referred as collectors 210A, 210B. Collectors 210A, 210B are spaced apart and face each other.

First array 215A includes a vertical graphene, and second array 215B also includes a vertical graphene. The vertical graphenes serve as electrodes. The electrodes include area $A_1$ and $A_2$, and are spaced apart by a distance D. A porous separator 220 is placed between arrays 215A, 215B, essentially separating the two electrodes. Collectors 210A, 210B, arrays 215A, 215B, and separator 220 are packaged into a gasket 225. The electrodes, i.e., the vertical graphene electrode materials, are soaked with an electrolyte.

In this embodiment, collectors 210A, 210B are metals with high conductivity, e.g., copper, stainless steel, and/or nickel. The vertical graphene in the electrodes may be grown directly on collectors 210A, 210B without any catalyst or binding material. In one embodiment, the vertical graphene is grown by PECVD using plasma sources such as DC, RF capacitively or inductively coupled, microwave, electron cyclotron resonance, or helicon.

The growth of the vertical graphene may require a hydrocarbon source. The hydrocarbon source may be diluted with hydrogen ($H_2$), nitrogen ($N_2$) or argon (Ar) in some embodiments. The hydrocarbon source may also include one of, but not limited to, methane, ethane, ethylene, and acetylene.

The growth process, and the rate of growth, are controlled by the type of hydrocarbon, the type of diluting gas (e.g., $H_2$, Ar, $N_2$) if any, total gas flow rate, pressure inside the PECVD reactor during growth, growth temperature, power input, type of metal for collectors 210A, 210B; type of the plasma source, and if there is an additional voltage bias on the collector metal substrate during growth.

For a given vertical graphene growth rate, the growth period determines the net height of vertical graphene in arrays 215A, 215B. When the height is smaller, the electrode material resistance $R_{em}$ is reduced in Equation (1). This height can be from 0.1 to couple of microns. Thinner electrodes also speed up ion transport and reduce ion transport resistance $R_{ion}$ in Equation (1). The direct growth of vertical graphene reduces the interfacial resistance $R_{int}$ in Equation (1). The height of arrays 215A, 215B together determine the spacing distance D between the electrodes.

It should be noted that in some embodiments that capacitance C is given by:

$$C = \varepsilon A/D \quad (2)$$

where $\varepsilon$ is the electrode material dielectric constant, A is the electrode area including all the pores, and D is the spacing distance. It should be appreciated that capacitance C may increase when spacing distance D is shorter.

The energy E and power P of the supercapacitor 200 are given by $$E = CV^2/2 \quad (3)$$

$$P = V^2/4R \quad (4)$$

where V is the cell voltage. Thus, increased capacitance can help to increase the energy density according to Equation (3). Reducing total resistance R as much as possible by systematically reducing each component in Equation (1) helps to increase the power density according to Equation (4).

The pore size distribution of vertical graphene in arrays 215A, 215B may be controlled by the list of parameters above. Mesopores (2-50 nm) may be ideal for ion transport. Vertical graphene has sufficient conductivity to reduce electrode material resistance $R_{em}$ in Equation (1), especially without any catalysts or binders. Vertical graphene is also chemically inert.

The separator 220 may separate the electrodes in array 215A, 215B to prevent electrode shorting. Separator 220 may be thin and contribute very little resistance $R_{sep}$ in Equation (1). Conventional separators may include Celgard, polypropylene, glass fiber, and cellulose fiber.

The choice of electrolyte is important to determine electrolyte resistance $R_{el}$ in Equation (1). A low electrolyte resistance $R_{el}$ is desirable in some embodiments. The choice of electrolyte also determines the operating voltage for supercapacitor 200. Based on Equations (3) and (4), the higher the voltage, higher the energy and power density. Aqueous electrolytes, such as KOH or $H_2SO_4$, provide about 1 volt as they are not stable at higher voltages. Organic electrolytes, such as propylene carbonate, can provide up to 3 volts. Room temperature ionic liquids can provide up to 5 volts.

In another embodiment, the pores in vertical graphene in arrays 215A, 215B are filled with a metal oxide. Vertical graphene alone in the cell acts as an EDLC. Adding a metal oxide may enable redox capacitance, increasing the total capacitance. This hybrid capacitor may be constructed with oxide of any of the following metals: Ruthenium (Ru), Tungsten (W), Vanadium (V), Carbon Monoxide (Co), Tin (Sn), Nickel (Ni), Copper (Cu), Titanium (Ti), Manganese (Mn), Magnesium (Mg), Chromium (Cr), Aluminum (Al), and Zinc (Zn).

The metal oxide may be deposited by using a physical or chemical approach. Furthermore, the metal oxide may be deposited onto the graphene directly by redox reaction with metal oxide negative ion. For example, if manganese oxide is used, Potassium Permanganate ($KMnO_4$) can be used with diluted Hydrogen Chloride (HCl) to control the Phosphorous (pH). Alternatively, electrochemical deposition also can be used to deposit the metal oxide using appropriate metal-containing precursors and applying a potential.

However, for the vertical graphene grown directly on the collector metal by PECVD, the following process may be beneficial. For example, the most appropriate process to add metal oxide for a good coverage of the porous structure may be CVD, starting from the corresponding metal-containing precursor gas or vapor mixed with oxygen. The growth temperature, pressure, and the feedgas type and composition can be used to control the deposition rate and the pore coverage.

In yet another embodiment, instead of a metal oxide, the vertical graphene in arrays 215A, 215B may be covered with an electrically conducting polymer to construct of a hybrid supercapacitor. Electrically conducting polymer may include polypyrrole, polyaniline, or any conducting polymer that would be appreciated by a person of ordinary skill in the art.

There are many well-known methods to prepare conducting polymers. One method may include chemical polymerization starting with the corresponding monomer and an oxidant. Another method may include electrochemical polymerization starting with the monomer in an aqueous electrolyte and applying the appropriate oxidizing potential.

FIG. 3 is a flow diagram 300 illustrating a process for manufacturing the supercapacitors, according to an embodiment invention. The process may begin at 305 with orienting a first collector and a second collector, such that the first collector and the second collector face each other. In this embodiment, the first collector and the second collector are separated by a predetermined, or a selected, distance D. A vertical graphene electrode material may be grown on each of the first and second collectors at 310. The vertical graphene electrode materials may be grown without catalyst or binders, and the height of these materials may range from 0.1-5 μm with pore distribution dominantly mesopores (2-50 nm).

At 315, a separator is placed between the vertical graphene electrode materials, and, at 320, the vertical graphene electrode materials are soaked in an electrolyte to fill the vertical graphene electrode materials with electrolytes. It should be appreciated that the time period for soaking may depend on the type of liquid that is being used. In some embodiments, the soaking process is relatively quick. At 325, a packaging assembly is placed to enclose the first and second collectors, the vertical graphene electrode materials, and the separator, creating a supercapacitor.

FIG. 4 is a flow diagram 400 illustrating a process for growing the vertical graphene electrode materials, according to an embodiment of the present invention. The process begins at 405 with directly growing a vertical graphene electrode material on each of the first and second collectors. At 410, the vertical graphene electrode materials are filled with a metal oxide to provide a redox capacitance, thereby constructing a hybrid supercapacitor. In an alternative embodiment, the vertical graphene electrode materials are covered with an electrically conducting polymer to provide redox capacitance, thereby constructing a hybrid supercapacitor.

In summary, embodiments of the present invention pertain to a supercapacitor that includes a pair of collectors facing each other. Vertical graphene electrode material is grown on each collector without catalyst or binders, and a separator is used to separate the vertical graphene electrode materials.

The features, structures, or characteristics of the invention described throughout this specification may be combined in any suitable manner in one or more embodiments. For example, reference throughout this specification to "certain embodiments," "some embodiments," or similar language means that a particular feature, structure, or characteristic described in connection with the embodiment is included in at least one embodiment of the present invention. Thus, appearances of the phrases "in certain embodiments," "in some embodiment," "in other embodiments," or similar language throughout this specification do not necessarily all refer to the same group of embodiments and the described features, structures, or characteristics may be combined in any suitable manner in one or more embodiments.

It should be noted that reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

The invention claimed is:

1. A method for producing a hybrid supercapacitor, comprising:
   orienting a first collector and a second collector so that the first collector and the second collector are spaced apart from and face each other;
   growing a porous first vertical graphene electrode structure on a first collector and a porous second vertical graphene electrode structure on a second collector, such that at least one pore in each of the first and second vertical graphene electrode structures is filled with a metal oxide to provide a redox capacitance, wherein the growing of the porous first vertical graphene electrode structure and of the porous second vertical graphene electrical structure comprises growing the porous first vertical graphene electrode structure and the porous second vertical graphene electrode structure by plasma enhanced chemical vapor deposition (PECVD) to create the hybrid supercapacitor with no catalyst for growth, no binder to mix the first and second vertical graphene electrode structures and the metal oxide, or both; and
   separating, the first vertical graphene structure and the second vertical graphene structure from each other, using a separator,
   wherein the first vertical graphene structure is a carbon nanowall and second vertical graphene structure is a carbon nanowall.

2. The method of claim 1, wherein said growing of the said first vertical graphene electrode structure and said second vertical grapheme electrode structure comprises:
   using at least one hydrocarbon source for said growth.

3. The method of claim 1, further comprising:
   packaging said first collector, said second collector, said first vertical graphene electrode structure, said second vertical graphene electrode structure and said separator into an assembly to form the hybrid supercapacitor.

4. The method of claim 1, further comprising choosing said metal oxide to be an oxide comprising at least one of Ru, W, V, Sn, Ni, Cu, Ti, Mn, Mg, Cr, Al and Zn.

5. An apparatus comprising:
   a first collector and a second collector, configured to face each other and separated by a selected non-zero distance;
   a porous first vertical graphene electrode structure directly grown on the first collector by plasma enhanced chemical vapor deposition (PECVD), and a porous second vertical graphene electrode structure directly grown on the second collector by the PECVD, to form a hybrid supercapacitor with no catalyst for growth, no binder to mix the first and second vertical graphene electrode structures and metal oxide, or both, wherein
      at least one pore in each of the first vertical graphene electrode structure and the second vertical graphene electrode structure is filled with the metal oxide, to provide a redox capacitance;
   a separator configured to separate the first vertical graphene electrode material and the second vertical graphene electrode material; and
   a packaging assembly configured to enclose the first collector, the second collector, the first vertical graphene electrode structure, the second vertical graphene electrode structure, and the separator to form the hybrid supercapacitor, wherein the first vertical graphene structure is a carbon nanowall and second vertical graphene structure is a carbon nanowall.

6. An apparatus comprising at least first and second collectors, spaced apart and oriented to face each other;

first and second porous vertical graphene electrode structures grown on the first and second collectors, respectively, wherein the first and second porous vertical graphene electrode structures are grown by plasma enhanced chemical vapor disposition (PECVD) to form a hybrid supercapacitor with no catalyst for growth, no binder to mix the first and second vertical graphene electrode structures and metal oxide, or both, and at least one pore in each of the first and second vertical electrode structures is filled with a metal oxide, to provide a redox-type capacitance; and a separator configured to separate the first and second vertical graphene electrode structures on the first collector and on the second collector from each other, wherein the first vertical graphene structure is a carbon nanowall and the second vertical graphene structure is a carbon nanowall.

7. The apparatus of claim 6, wherein said vertical graphene electrode structures are grown using a plasma source.

8. The apparatus of claim 6, wherein said vertical graphene electrode structures are grown using at least one hydrocarbon source.

9. The apparatus of claim 6, further comprising:

a packaging assembly configured to enclose said first and second collectors, said first and second vertical graphene electrode structures and said separator to form the hybrid supercapacitor.

10. The apparatus of claim 6, wherein said metal oxide is an oxide comprising at least one of Ru, W, V, Sn, Ni, Cu, Ti, Mn, Mg, Cr, Al and Zn.

11. The apparatus of claim 6, wherein said at least one pore in each of said first and second porous vertical graphene electrode structures has a pore diameter in a range of 2-50 nm.

* * * * *